(12) United States Patent
Li et al.

(10) Patent No.: US 9,397,548 B2
(45) Date of Patent: Jul. 19, 2016

(54) DC-DC CONVERTER SYSTEMS

(71) Applicants: ABB Research Ltd., Zurich (CH); ABB Inc., Raleigh, NC (US)

(72) Inventors: Jun Li, Raleigh, NC (US); Wu Chen, Nanjing (CN)

( * ) Notice: Subject to any disclaimer, the term of this patent is extended or adjusted under 35 U.S.C. 154(b) by 30 days.

(21) Appl. No.: 13/723,915

(22) Filed: Dec. 21, 2012

(65) Prior Publication Data

US 2013/0163302 A1 Jun. 27, 2013

Related U.S. Application Data

(60) Provisional application No. 61/580,167, filed on Dec. 23, 2011.

(51) Int. Cl.
| | |
|---|---|
| H02M 3/06 | (2006.01) |
| H02M 1/08 | (2006.01) |
| H02M 3/158 | (2006.01) |
| H02J 3/38 | (2006.01) |
| H02M 1/00 | (2006.01) |

(52) U.S. Cl.
CPC ............ *H02M 1/08* (2013.01); *H02J 3/386* (2013.01); *H02M 3/06* (2013.01); *H02M 3/158* (2013.01); *H02M 2001/0077* (2013.01); *Y02B 70/1425* (2013.01); *Y02E 10/763* (2013.01)

(58) Field of Classification Search
USPC ........ 363/140, 59, 61, 60, 214, 21.17, 68, 65; 323/209, 210, 223, 232, 233
See application file for complete search history.

(56) References Cited

U.S. PATENT DOCUMENTS

| | | | |
|---|---|---|---|
| 5,270,913 A | 12/1993 | Limpaecher | |
| 5,357,419 A | 10/1994 | Limpaecher | |
| 5,561,597 A | 10/1996 | Limpaecher | |
| 5,691,631 A * | 11/1997 | Shimamori | ......... H02M 3/1582 323/222 |

(Continued)

FOREIGN PATENT DOCUMENTS

| | | |
|---|---|---|
| JP | 63-154061 A | 6/1988 |
| JP | 09-191638 A | 7/1997 |

(Continued)

OTHER PUBLICATIONS

P. Shuai, Y. De Novaes, F. Canales, and I. Barbi, "A Non-Insulated Resonant Boost Converter," Twenty-Fifth Annual IEEE Applied Power Electronics Conference and Exposition, pp. 550-556, Feb. 21-25, 2010.

(Continued)

*Primary Examiner* — Timothy J Dole
*Assistant Examiner* — Bryan R Perez
(74) *Attorney, Agent, or Firm* — Taft Stettinius & Hollister LLP

(57) ABSTRACT

DC-DC converter systems are disclosed. DC-DC converter systems may include an input, an output, a resonant switched-capacitor DC-DC converter, and a second DC-DC converter. The resonant switched-capacitor DC-DC converter may include a first input side and a first output side. The second DC-DC converter may include a second input side and a second output side. The first input side may be connected to the input, the second input side may be connected to an input voltage, and the first and second output sides may be connected in series to the output. In some examples, the second DC-DC converter may be a buck-boost DC-DC converter.

25 Claims, 5 Drawing Sheets

(56) References Cited

U.S. PATENT DOCUMENTS

| | | | |
|---|---|---|---|
| 5,764,501 | A | 6/1998 | Limpaecher |
| 5,986,907 | A | 11/1999 | Limpaecher |
| 6,118,678 | A | 9/2000 | Limpaecher |
| 7,402,983 | B2 | 7/2008 | Jacobson |
| 7,659,700 | B2 | 2/2010 | Holveck |
| 8,036,008 | B2 * | 10/2011 | Ikeda et al. ............ 363/68 |
| 8,040,702 | B2 * | 10/2011 | Urakabe et al. .......... 363/65 |
| 2007/0014135 | A1 | 1/2007 | Taurand |
| 2008/0129258 | A1 | 6/2008 | Taurand |
| 2009/0261793 | A1 * | 10/2009 | Urakabe ........... H02J 7/0016 323/282 |
| 2010/0019753 | A1 * | 1/2010 | Ikeda ............... H02M 3/158 323/311 |
| 2011/0044076 | A1 * | 2/2011 | Zhang et al. ........ 363/21.17 |

FOREIGN PATENT DOCUMENTS

| | | | |
|---|---|---|---|
| JP | 2002-369500 A | | 12/2002 |
| JP | 2006262619 A | * | 9/2006 |
| WO | 2013095685 A1 | | 6/2013 |

OTHER PUBLICATIONS

W. Chen, A. Q. Huang, C. Li, G. Wang and W. Gu, "Analysis and Comparison of Medium Voltage High Power DC/DC Converters for Offshore Wind Energy Systems," IEEE Transactions on Power Electronics, vol. 28, No. 4, pp. 2014-2023, Apr. 2013.

I. C. Evans, R. Limpaecher and A. Dillon, "Powering the Way—A Paper on AC Link Technology for 21st Century HVDC Transmission," IEEE Energy2030 Conference, Atlanta, GA USA, Nov. 17-18, 2008.

PCT International Patent Application No. PCT/US12/21401, filed Jan. 15, 2012.

W. Chen; A. Huang, C. Li and G. Wang, "A high efficiency high power step-up resonant switched-capacitor converter for offshore wind energy systems," 2012 IEEE Energy Conversion Congress and Exposition (ECCE), pp. 235-239, Sep. 15-20, 2012.

W. Chen, A. Huang, S. Lukic, J. Svensson, J. Li, and Z. Wang, "A comparison of medium voltage high power DC/DC converters with high step-up conversion ratio for offshore wind energy systems," IEEE Energy Conversion Congress and Exposition (ECCE 2011), pp. 584-589, Sep. 2011.

N. Denniston, A. Massoud, S. Ahmed and P. Enjeti, "Multiple module high gain high voltage DC-DC transformers for offshore wind energy systems," IEEE Transactions on Industrial Electronics, vol. 58, No. 5, pp. 1877-1886, May 2011.

D. Jovcic, "Step-up DC-DC converter for megawatt size applications," IET Power Electron., vol. 2, No. 6, pp. 675-685, 2009.

Y. Yeung, K. Cheng, S. Ho, K. Law, and D. Sutanto, "Unified analysis of switched-capacitor resonant converters," IEEE Transactions on Industrial Electronics, vol. 51, No. 4, pp. 864-873, 2004.

Limpaecher, R. and Rodriguez, R., "Resonant link PFN charger and modulator power supply," 16th IEEE International Pulsed Power Conference, vol. 2, pp. 1495-1499, Jun. 2007.

Limpaecher, R. and Rodriguez, R., "Resonant Link PFN Charger and Modulator Power Supply," IEEE 34th International Conference on Plasma Science (ICOPS 2007), p. 866, Jun. 2007

I. Evans and R. Limpaecher, "High power clean DC bus generation using AC-link AC to DC power voltage conversion, DC regulation, and galvanic isolation," IEEE Electric Ship Technologies Symposium (ESTS 2009), pp. 290-301, Apr. 20-22, 2009.

Jin Yong Bae, Korean Intellectual Property Office (ISA/KR), International Search Report and Written Opinion of the International Searching Authority for International Application No. PCT/US2012/021401, mailed Dec. 18, 2012.

U.S. Appl. No. 14/368,095, filed Jun. 23, 2014.

* cited by examiner

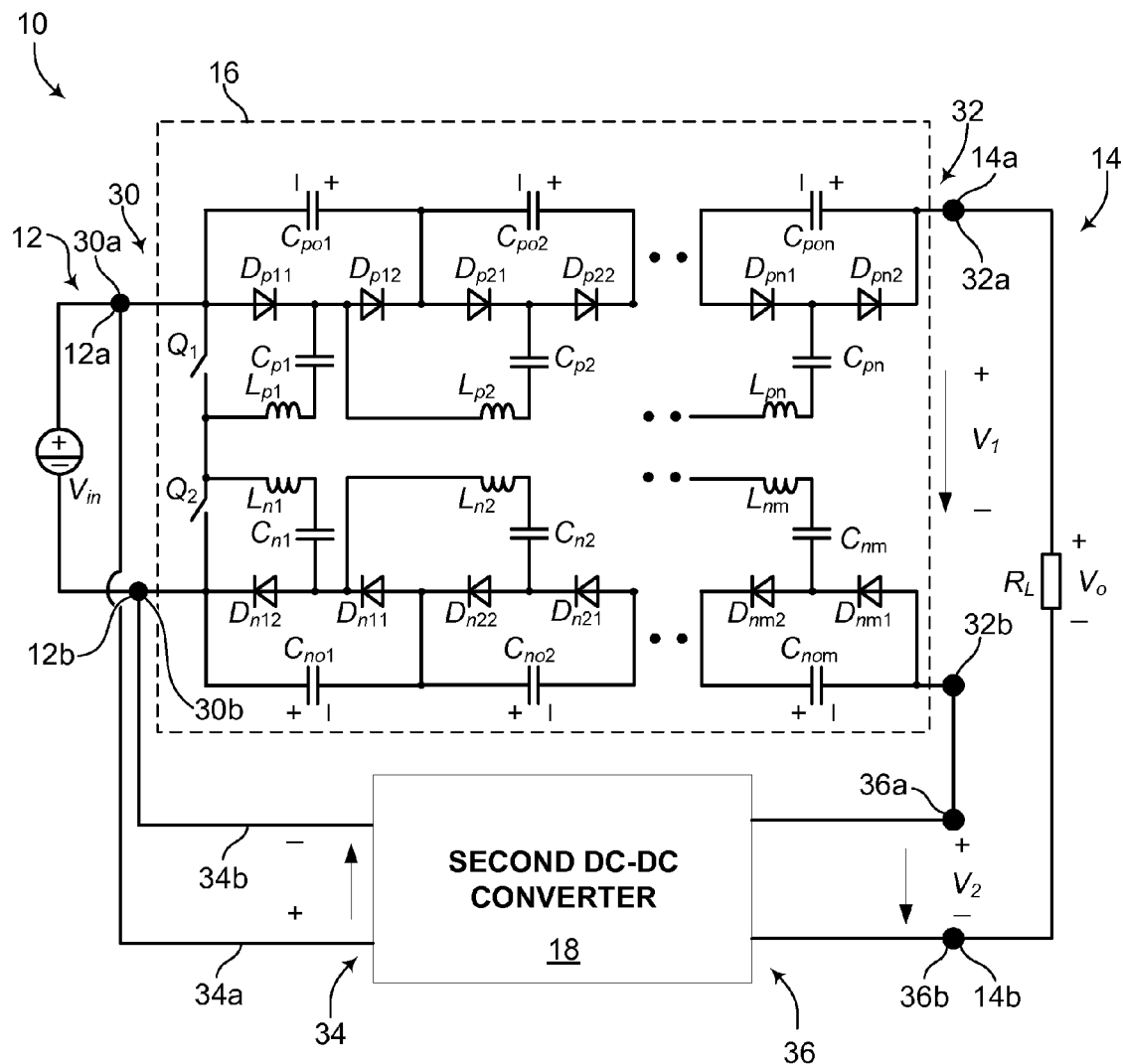
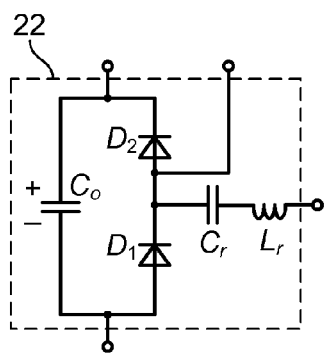
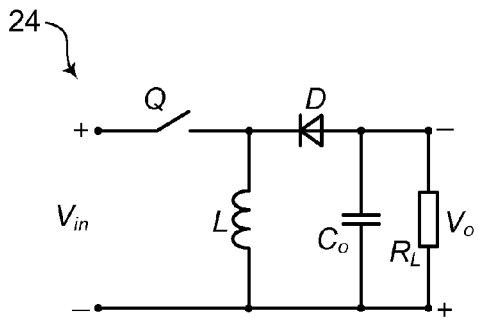
Fig. 1
Fig. 2
Fig. 3

US 9,397,548 B2

DC-DC CONVERTER SYSTEMS

FIELD OF THE DISCLOSURE

The present disclosure relates to DC-DC converters, and more particularly to DC-DC converter systems that include a resonant switched-capacitor DC-DC converter.

SUMMARY

In some examples, DC-DC converter systems may include an input, an output, a resonant switched-capacitor DC-DC converter, and a second DC-DC converter. The resonant switched-capacitor DC-DC converter may include a first input side and a first output side. The second DC-DC converter may include a second input side and a second output side. The first input side may be connected to the input, the second input side may be connected to an input voltage, and the first and second output sides may be connected in series to the output.

In some examples, DC-DC converter systems may include an input, an output, a resonant switched-capacitor DC-DC converter, and a second DC-DC converter. The input may include a positive terminal and a negative terminal. The output may include a positive terminal and a negative terminal. The resonant switched-capacitor DC-DC converter may include positive and negative input terminals and positive and negative output terminals. The second DC-DC converter may include positive and negative input terminals and positive and negative output terminals. The positive and negative input terminals of the resonant switched-capacitor DC-DC converter may be connected to the respective positive and negative terminals of the input. The positive and negative input terminals of the second DC-DC converter may be connected across an input voltage. The positive output terminal of the resonant switched-capacitor DC-DC converter may be connected to the positive terminal of the output. The negative output terminal of the resonant switched-capacitor DC-DC converter may be connected to the positive output terminal of the second DC-DC converter. The negative output terminal of the second DC-DC converter may be connected to the negative terminal of the output.

BRIEF DESCRIPTION OF DRAWINGS

FIG. 1 is a schematic diagram of a nonexclusive illustrative example of a DC-DC converter system.

FIG. 2 is a schematic diagram of a nonexclusive illustrative example of a modular cell for the resonant switched-capacitor DC-DC converter of the DC-DC converter system of FIG. 1.

FIG. 3 is a schematic diagram of a nonexclusive illustrative example of a buck-boost DC-DC converter suitable for use as a second DC-DC converter for the DC-DC converter system of FIG. 1.

DETAILED DESCRIPTION

Figure 4:
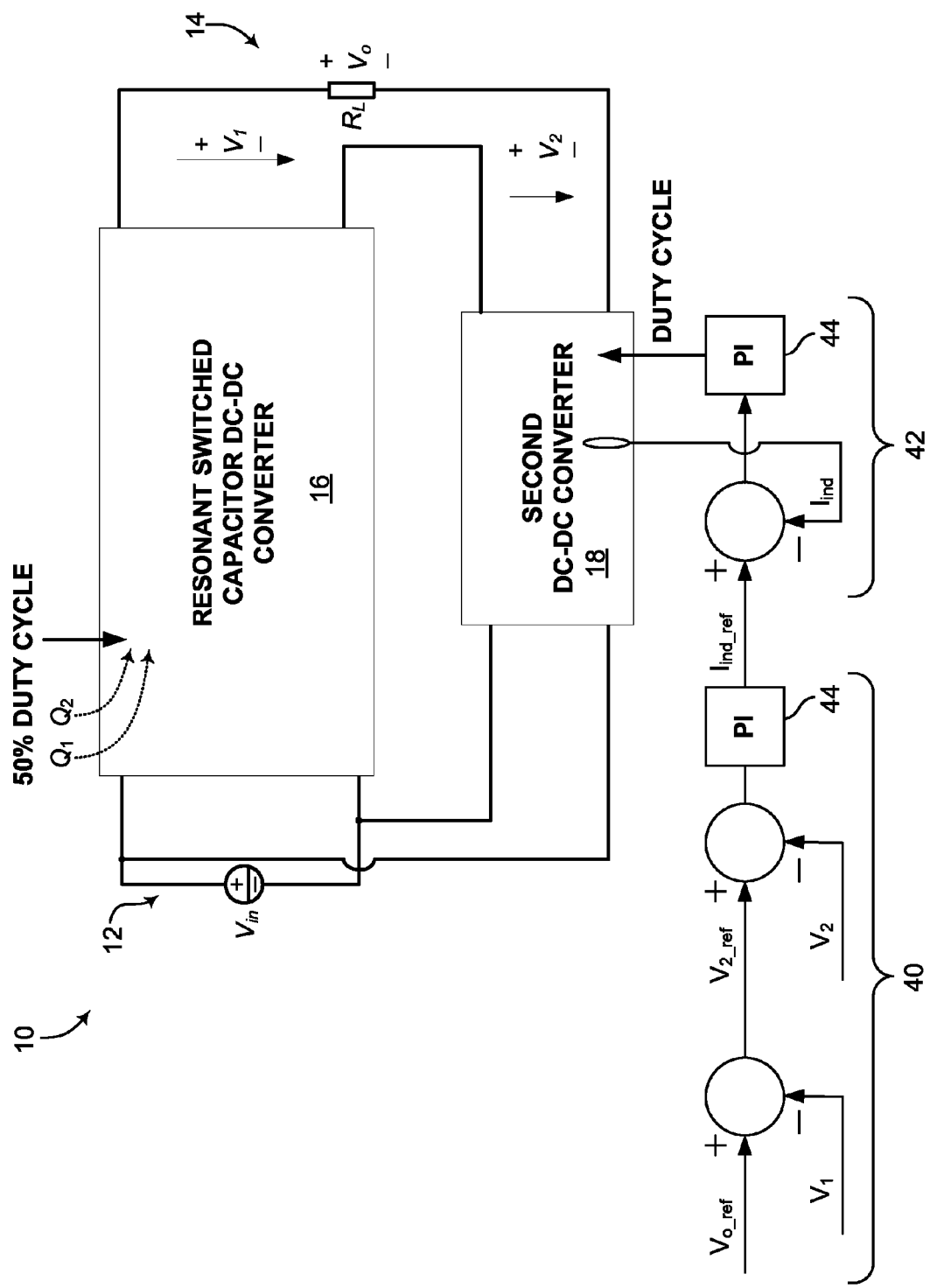
FIG. 4 is a control scheme diagram of a nonexclusive illustrative example of a control scheme suitable for use with the DC-DC converter system of FIG. 1.

A nonexclusive illustrative example of a DC-DC converter system is shown generally at 10 in FIG. 1. Unless otherwise specified, DC-DC converter system 10 may, but is not required to, contain at least one of the structures, components, functionalities, and/or variations described, illustrated, and/or incorporated herein. In the illustrated example, the DC-DC converter system 10 includes an input 12, an output 14, a resonant switched-capacitor DC-DC converter 16, and a second DC-DC converter 18.

As shown in FIG. 1, the resonant switched-capacitor DC-DC converter 16 may be an m+n+1_level zero-current-switching (ZCS) resonant switched-capacitor (RSC) converter, which works as an m+n+1 times step-up converter, where m and n are the numbers of negative and positive modular cells, respectively. As may be understood, m and n may be any suitable number such as 1, 2, 3, 4, 5, 6, 7, 8, 9, 10, 11, or even 12 or more.

A nonexclusive illustrative example of a basic modular cell 22 for the resonant switched-capacitor DC-DC converter 16 is shown in FIG. 2. In the illustrated example, the basic modular cell 22 includes two diodes, $D_1$ and $D_2$, a filter capacitor, $C_o$, a resonant capacitor, $C_r$, and a resonant inductor, $L_r$. In some examples, a small air-core inductor or parasitic inductor may be used in the circuit for the basic modular cell 22 due to the small value of the resonant inductance.

As shown in FIG. 1, the resonant switched-capacitor DC-DC converter 16 may include first and second switches $Q_1$ and $Q_2$, which may be of any suitable type or configuration. In some examples, the switches $Q_1$ and $Q_2$ may be or include insulated gate bipolar transistors (IGBTs). The switches $Q_1$ and $Q_2$ may be complementarily controlled to operate with about a 50% duty cycle. For example, when $Q_1$ is closed or turned on while $Q_2$ is open or turned off, all of the negative resonant capacitors ($C_{n1}, C_{n2}, \ldots, C_{nm}$) are charged by input voltage source $V_{in}$ and/or the negative filter capacitors ($C_{no1}, C_{no2}, \ldots, C_{no(m-1)}$) through negative resonant inductors ($L_{n1}, L_{n2}, \ldots, L_{nm}$) in a sinusoidal shape, and in the meanwhile, the energy stored in the positive resonant capacitors ($C_{p1}, C_{p2}, \ldots, C_{pn}$) is released to positive filter capacitors ($C_{po1}, C_{po2}, \ldots, C_{pon}$) through positive resonant inductors ($L_{p1}, L_{p2}, \ldots, L_{pn}$) in a sinusoidal waveform. At the end of a half switching period, all of the currents of the resonant inductors decrease to zero when the switching frequency is the same as resonant frequency. When $Q_2$ is closed or turned on while $Q_1$ is open or turned off, the energy stored in the negative resonant capacitors ($C_{n1}, C_{n2}, \ldots, C_{nm}$), which were charged in the first half switching period, is released to the corresponding negative filter capacitors ($C_{no1}, C_{no2}, \ldots, C_{nom}$) through the negative resonant inductors ($L_{n1}, L_{n2}, \ldots, L_{nm}$) in a sinusoidal shape, and in the meanwhile, all the positive resonant capacitors ($C_{p1}, C_{p2}, \ldots, C_{pn}$) are charged by the input voltage source $V_{in}$ and/or the positive filter capacitors ($C_{po1}, C_{po2}, \ldots, C_{po(n-1)}$) through the positive resonant inductors ($L_{p1}, L_{p2}, \ldots, L_{pn}$) in a sinusoidal waveform. All of the filter capacitors and the input voltage source power the load. As may be understood, the positive modular cells and the negative modular cells work separately.

As may be understood, the modular structure and soft-switching operation of the resonant switched-capacitor DC-DC converter may provide a DC-DC converter that supports high step-up voltage ratios with a relatively high efficiency. However, operation of the first and second switches $Q_1$ and $Q_2$ at a fixed 50% duty cycle operates the resonant switched-capacitor DC-DC converter in an open loop, rather than a closed loop, and results in a fixed step-up voltage ratio with no regulation of the output voltage $V_1$ of the resonant switched-capacitor DC-DC converter.

However, as will be more fully discussed below, inclusion of the second DC-DC converter 18, which is able to regulate its output voltage $V_2$, allows for regulation and/or control of the total output voltage $V_o$ of the DC-DC converter system 10, which may be a requirement for some applications. The second DC-DC converter 18 may be any suitable DC-DC converter. In some examples, the second DC-DC converter 18 may be a suitable buck-boost converter, such as the nonexclusive illustrative example illustrated in FIG. 3 at 24, which is an inverting buck-boost converter that includes a switch Q, a diode D, an inductor L, and a capacitor $C_o$. It should be understood that the illustrated buck-boost converter is merely an example, and many other buck-boost or other converter topologies may be suitable for use as the second DC-DC converter 18.

The input 12 of the DC-DC converter system 10 includes a positive terminal 12a and a negative terminal 12b, and the output 14 of the DC-DC converter system 10 includes a positive terminal 14a and a negative terminal 14b. The resonant switched-capacitor DC-DC converter 16 includes an input side 30 with positive and negative input terminals 30a, 30b and an output side 32 with positive and negative output terminals 32a, 32b The second DC-DC converter 18 includes an input side 34 with positive and negative input terminals 34a, 34b and an output side 36 with positive and negative output terminals 36a, 36b.

As shown in FIG. 1, the positive and negative input terminals 30a, 30b of the resonant switched-capacitor DC-DC converter's input side 30 may be connected to the respective positive and negative terminals 12a, 12b of the input 12. The positive and negative input terminals 34a, 34b of the second DC-DC converter's input side 34 may be connected to or across an input voltage. As shown in the example presented in FIG. 1, the positive and negative input terminals 34a, 34b of the second DC-DC converter's input side 34 and the positive and negative input terminals 30a, 30b of the resonant switched-capacitor DC-DC converter's input side 30 may be connected in parallel to the respective positive and negative terminals 12a, 12b of the input 12, such that the resonant switched-capacitor DC-DC converter 16 and the second DC-DC converter 18 use the same input voltage $V_{in}$. The output sides of the resonant switched-capacitor DC-DC converter 16 and the second DC-DC converter 18 may be connected in series to the output 14 such that the converter system output voltage $V_o$ (between the positive and negative terminals 14a, 14b of the output) is the sum of the output voltage $V_1$ of the resonant switched-capacitor DC-DC converter (between its positive and negative output terminals 32a, 32b) and the output voltage $V_2$ of the second DC-DC converter (between its positive and negative output terminals 36a, 36b). In particular, the positive output terminal 32a of the resonant switched-capacitor DC-DC converter 16 may be connected to the positive terminal 14a of the output 14, the negative output terminal 32b of the resonant switched-capacitor DC-DC converter 16 may be connected to the positive output terminal 36a of the second DC-DC converter 18, and the negative output terminal 36b of the second DC-DC converter 18 may be connected to the negative terminal 14b of the output 14.

Some examples of the DC-DC converter system 10 may be designed or configured such that the resonant switched-capacitor DC-DC converter 16 may provide a relatively large portion of the rated output voltage of the DC-DC converter system 10. For example, the resonant switched-capacitor DC-DC converter 16 may have a rated output voltage that is greater than the rated output voltage of the second DC-DC converter 18. In some examples, the rated output voltage of the resonant switched-capacitor DC-DC converter may be greater than about 5, 10, 15 or even 20 more times the rated output voltage of the second DC-DC converter.

As a more specific example, the DC-DC converter system 10 may be designed or configured such that the resonant switched-capacitor DC-DC converter 16 provides about 90% to about 95% of the rated output voltage of the DC-DC converter system, while the second DC-DC converter 18 provides about 5% to about 10% of the rated output voltage of the DC-DC converter system. As may be understood, such a DC-DC converter system may be useful in applications where overall high efficiency is sought while a relatively narrow voltage regulation range is needed. In such an example, the resonant switched-capacitor DC-DC converter provides the main portion of a high step-up voltage conversion ratio and a high power for the DC-DC converter system. The high efficiency and high power density of the resonant switched-capacitor DC-DC converter may result in an overall high efficiency and high power density for the DC-DC converter system. The second DC-DC converter, which may be regulated in a closed-loop, performs and provides the output voltage regulation function for the DC-DC converter system, with a regulation capacity of about 5% to about 10% of the rated output voltage of the DC-DC converter system. As may be understood, the addition of the second DC-DC converter to the DC-DC converter system to support a relatively narrow or low level of voltage regulation, as compared to the overall voltage rating, may result in a relatively low incremental or added cost over or to the resonant switched-capacitor DC-DC converter because the second DC-DC converter need only support a relatively small portion of the total output voltage and transfer a relatively small portion of the total power for the DC-DC converter system.

Other fractional divisions between the contributions of the resonant switched-capacitor DC-DC converter and the second DC-DC converter may also be considered. For example, if a relatively higher output voltage regulation capacity is needed, a relatively larger second DC-DC converter may be used, possibly with a relatively smaller resonant switched-capacitor DC-DC converter. In such an example, a reduction in overall efficiency and a higher incremental cost, due to the higher rated second DC-DC converter, may be acceptable to achieve a necessary higher output voltage regulation capacity. Contrariwise, if very little output voltage regulation capacity is needed, high overall efficiency, and low incremental added cost, may be realized with a large resonant switched-capacitor DC-DC converter and only a small second DC-DC converter.

A nonexclusive illustrative example of a control scheme suitable for use with the DC-DC converter system 10 is illustrated in FIG. 4. In particular, as discussed and suggested above, the DC-DC converter system may control the output voltage $V_2$ of the second DC-DC converter 18 to control the converter system output voltage $V_o$. The output voltage $V_1$ of the resonant switched-capacitor DC-DC converter 16 remains relatively constant due to the constant 50% duty cycle of the first and second switches $Q_1$ and $Q_2$ of the resonant switched-capacitor DC-DC converter. The second DC-DC converter 18 may be controlled by an outer voltage loop 40 and an inner current loop 42. The reference voltage $V_{2\_ref}$ for the second DC-DC converter 18 may be obtained by subtracting the actual resonant switched-capacitor DC-DC converter voltage $V_1$ from the reference voltage $V_{0\_ref}$ of the whole DC-DC converter system. As shown in FIG. 4, in some examples, proportional-integral (PI) controllers 44 may be used for the voltage and current loops.

Figure 5:
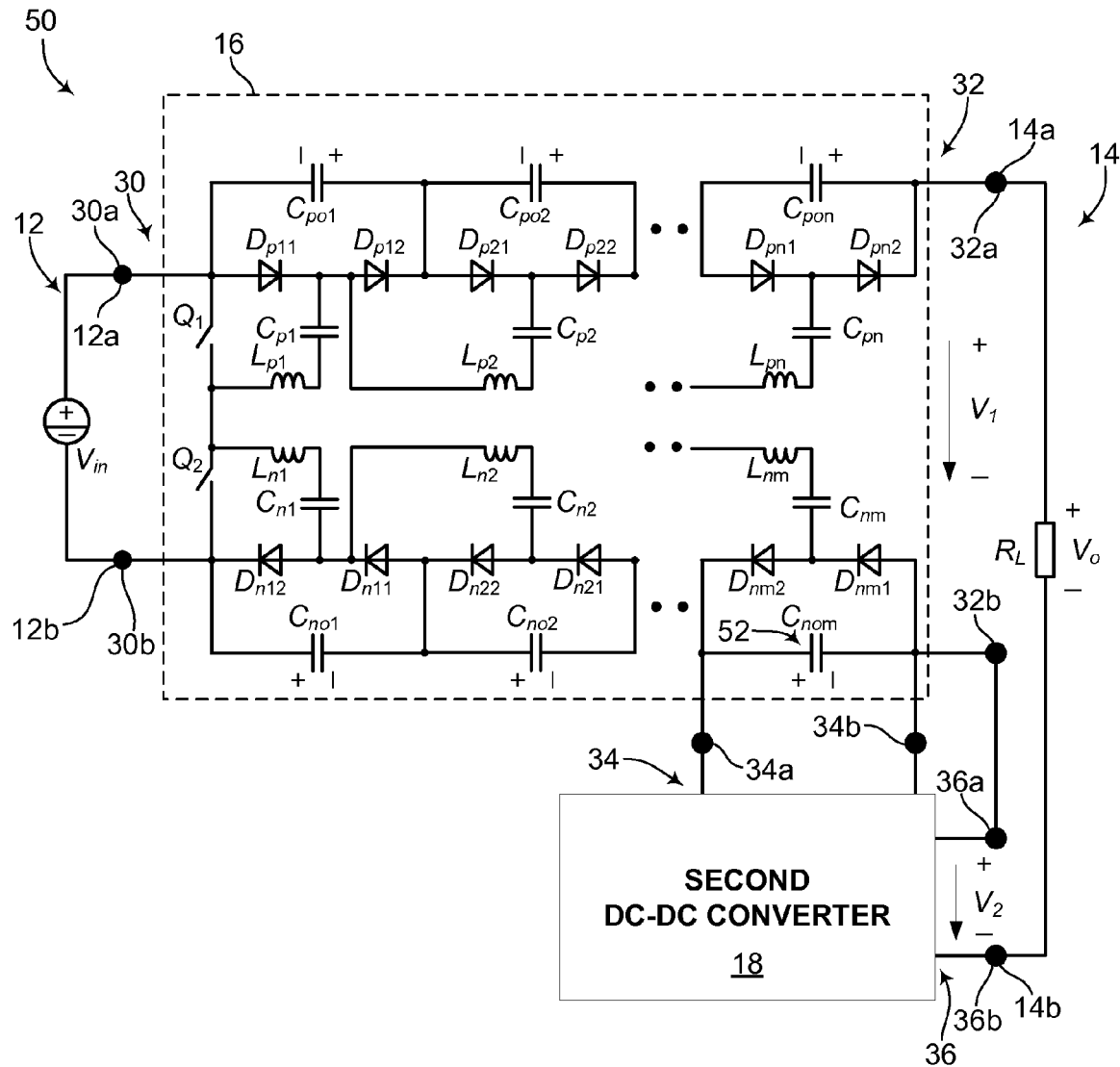
FIG. 5 is a schematic diagram of another nonexclusive illustrative example of a DC-DC converter system.

Another nonexclusive illustrative example of a DC-DC converter system is shown generally at 50 in FIG. 5. Unless otherwise specified, the DC-DC converter system 50 may, but is not required to, contain at least one of the structures, components, functionalities, and/or variations described, illustrated, and/or incorporated herein. In the illustrated example, the DC-DC converter system 50 includes an input 12, an output 14, a resonant switched-capacitor DC-DC converter 16, and a second DC-DC converter 18. As shown in FIG. 5, the second DC-DC converter 18 may have its positive and negative input terminals 34a, 34b connected across one of the filter capacitors 52 of the resonant switched-capacitor DC-DC converter 16. In some examples, rather than being connected across one of the negative filter capacitors, as in the DC-DC converter system 50, the positive and negative input terminals 34a, 34b may be connected across one of the positive filter capacitors.

Figure 6:
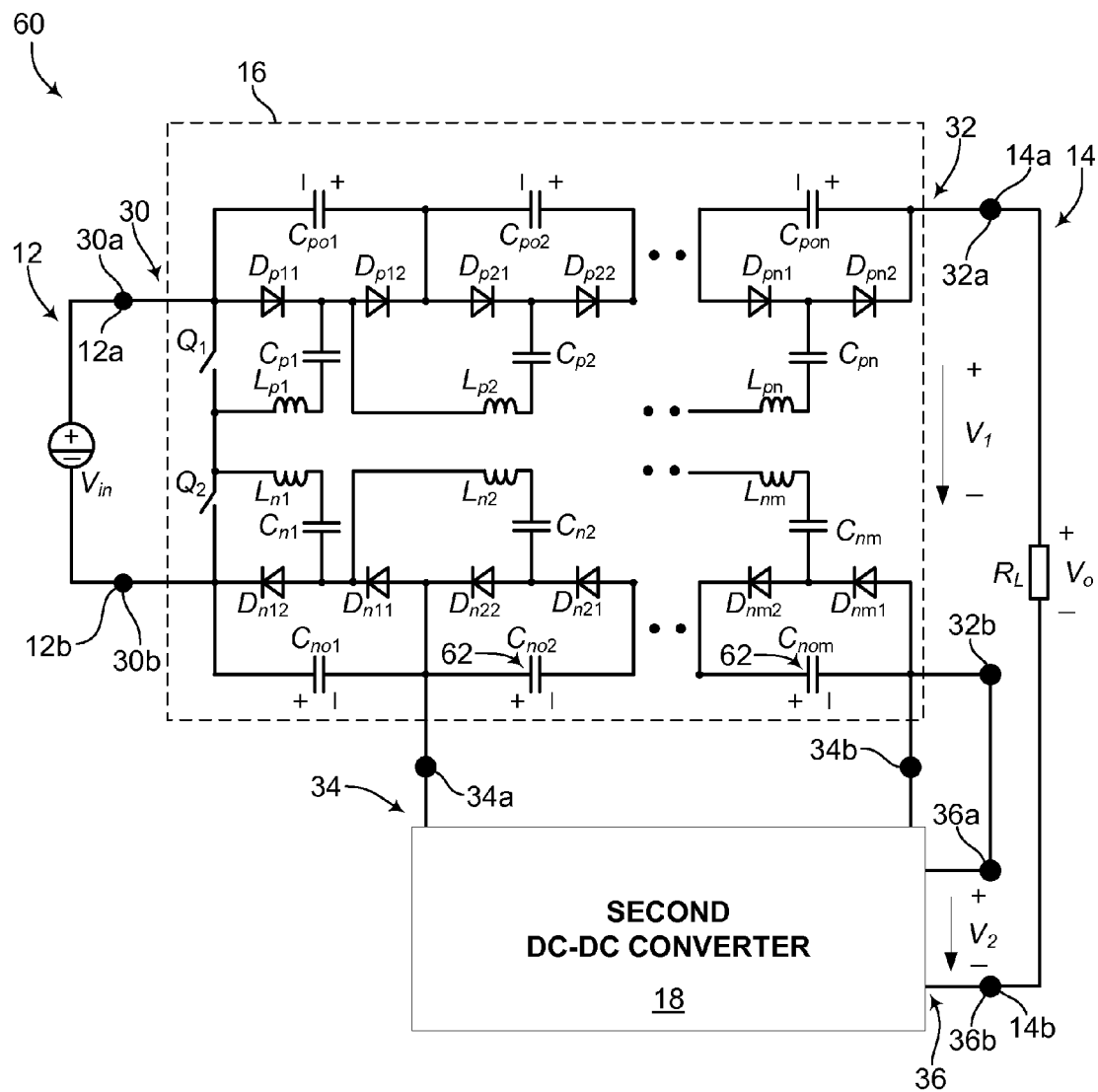
FIG. 6 is a schematic diagram of another nonexclusive illustrative example of a DC-DC converter system.

Another nonexclusive illustrative example of a DC-DC converter system is shown generally at 60 in FIG. 6. Unless otherwise specified, DC-DC converter system 60 may, but is not required to, contain at least one of the structures, components, functionalities, and/or variations described, illustrated, and/or incorporated herein. In the illustrated example, the DC-DC converter system 60 includes an input 12, an output 14, a resonant switched-capacitor DC-DC converter 16, and a second DC-DC converter 18. As shown in FIG. 6, the second DC-DC converter 18 may have its positive and negative input terminals 34a, 34b connected across two or more of the series-connected filter capacitors 62 of the resonant switched-capacitor DC-DC converter 16. As may be understood, the configuration of the DC-DC converter system 60 results in an input voltage for the second DC-DC converter 18 that is a multiple of the input voltage $V_{in}$ to the DC-DC converter system 60. In some examples, rather than being connected across two or more of the negative filter capacitors, as in the DC-DC converter system 60, the positive and negative input terminals 34a, 34b may be connected across two or more of the positive filter capacitors.

Figure 7:
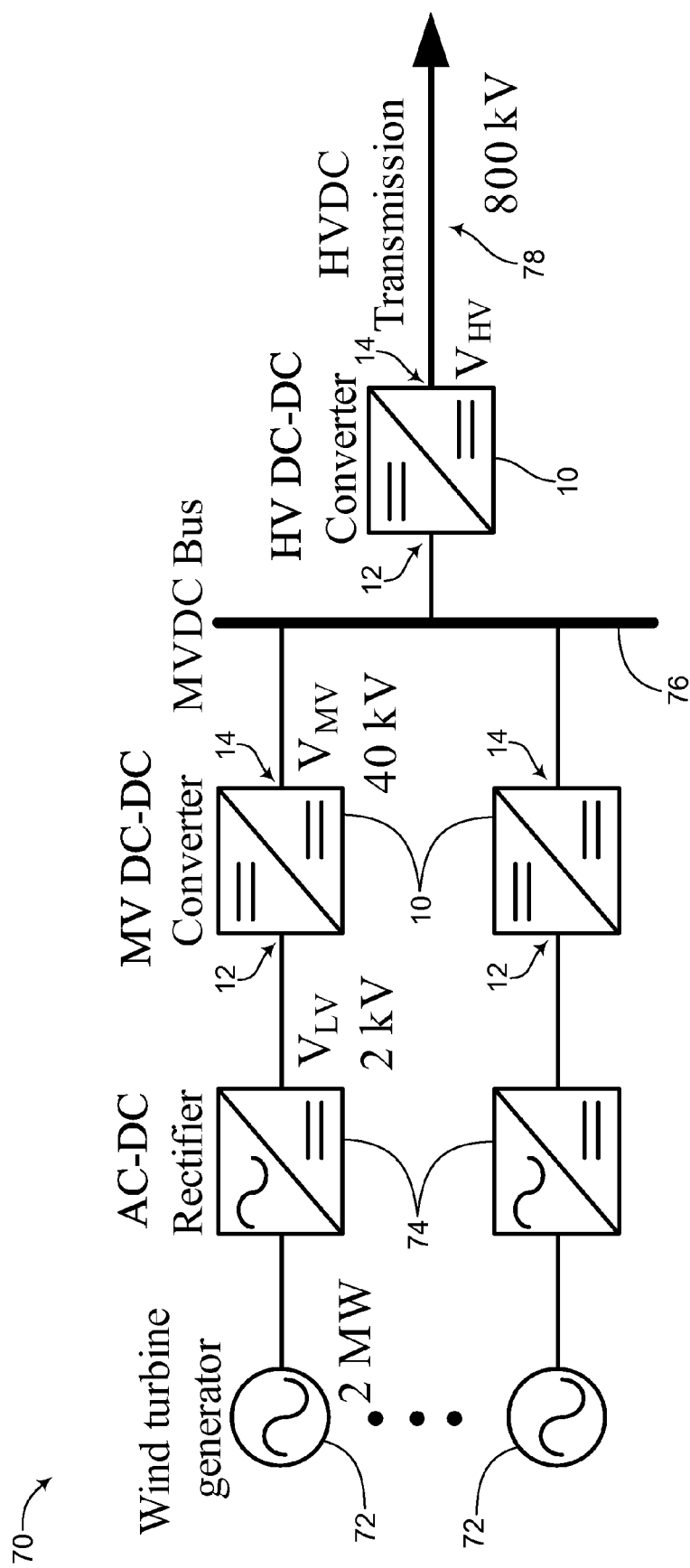
FIG. 7 is a schematic diagram of a grid collection that may include one or more examples of the DC-DC converter systems.

The DC-DC converter systems disclosed herein may be useful in any applications that need high step-up DC-DC converters. Nonexclusive illustrative examples of such applications include large solar farms and large wind farms, either of which may be offshore, with medium voltage DC (MVDC) grid collection. For example, as shown in FIG. 7, one or more examples of the DC-DC converter system 10 may be incorporated into a grid collection 70, which may include at least one generator 72, AC-DC rectifiers 74 connected to the generators 72 and an MVDC bus 76. By way of example, the generators 72 may be 2 MW wind turbine generators, and the MVDC bus 76 may be a 40 KV bus. As shown in FIG. 7, the inputs 12 of the DC-DC converter systems 10 are connected to the outputs of the AC-DC rectifiers 74, and the outputs 14 of the DC-DC converter systems are connected to the MVDC bus 76, such that the DC-DC converter systems 10 are acting as medium voltage (MV) step-up DC-DC converters. In some examples, the grid collection 70 may include an additional DC-DC converter system 10, with its input 12 connected to the MVDC bus 76 and its output 14 connected to a high voltage DC transmission line 78, such that the additional DC-DC converter system 10 is operating as a high voltage (HV) step-up DC-DC converter.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A DC-DC converter system having an input and an output, the DC-DC converter system comprising:
    a resonant switched-capacitor DC-DC converter having:
        a first input side with positive and negative input terminals,
        a first output side with positive and negative output terminals,
        a positive leg connected from the positive input terminal to the positive output terminal and including a plurality of capacitors connected in series, and a first switch, and
        a negative leg connected from the negative input terminal to the negative output terminal and including a plurality of capacitors connected in series, and a second switch, and
        wherein the positive leg is connected to the negative input terminal through the second switch and the negative leg is connected to the positive input terminal through the first switch; and
    a second DC-DC converter separate from the resonant switched-capacitor DC-DC converter and having a second input side and a second output side, wherein the second input side is separate from the first input side; and
    wherein the first input side directly connects the resonant switched-capacitor DC-DC converter to the input, the second input side is connected to an input voltage, and the first and second output sides are connected in series to the output, such that an output voltage of the DC-DC converter system is a sum of the output voltage of the resonant switched-capacitor DC-DC converter between its positive and negative output terminals and the output voltage of the second DC-DC converter between its positive and negative output terminals.

2. The DC-DC converter system of claim 1, wherein the second input side directly connects the second DC-DC converter sides are connected in parallel to the input in parallel with the resonant switched-capacitor DC-DC converter.

3. The DC-DC converter system of claim 1, wherein the resonant switched-capacitor DC-DC converter includes a filter capacitor, and the second input side is connected across the filter capacitor.

4. The DC-DC converter system of claim 1, wherein the resonant switched-capacitor DC-DC converter includes at least two filter capacitors connected in series, and the second input side is connected in parallel to the at least two filter capacitors.

5. The DC-DC converter system of claim 1, wherein the resonant switched-capacitor DC-DC converter has a first rated output voltage, the second DC-DC converter has a second rated output voltage, and the first rated output voltage is greater than the second rated output voltage.

6. The DC-DC converter system of claim 5, wherein the first rated output voltage is greater than about ten times the second rated output voltage.

7. The DC-DC converter system of claim 1, wherein the first and second switches operate at about 50% duty cycles, the first switch is on while the second switch is off, and the second switch is on while the first switch is off.

8. The DC-DC converter system of claim 7 wherein the second DC-DC converter has a converter output voltage at the second output side, the DC-DC converter system has a converter system output voltage at the output, and the DC-DC converter system is configured to control the converter output voltage of the second DC-DC converter to control the converter system output voltage.

9. The DC-DC converter system of claim 1, wherein the second DC-DC converter is a buck-boost DC-DC converter.

10. The DC-DC converter system of claim 9 incorporated into a grid collection, the grid collection comprising:
an electrical power generator;
an AC-DC rectifier connected to the generator; and
a medium voltage DC bus, wherein the input of the DC-DC converter system is connected to the AC-DC rectifier and the output of the DC-DC converter system is connected to the medium voltage DC bus.

11. The grid collection of claim 10, wherein the DC-DC converter system is a first DC-DC converter system, the grid collection comprising:
a second DC-DC converter system having an input and an output, wherein the input of the second DC-DC converter system is connected to the medium voltage DC bus and the output of the second DC-DC converter system is connected to a high voltage DC transmission line.

12. The DC-DC converter system of claim 1, wherein the positive and negative legs each comprise a plurality of modular cells.

13. The DC-DC converter system of claim 12, wherein the modular cells each comprise a resonant capacitor, a resonant inductor, a pair of diodes and a filter capacitor, and the pair of diodes are connected in series with each other and in parallel with the filter capacitor.

14. A DC-DC converter system, comprising:
an input having a positive terminal and a negative terminal;
an output having a positive terminal and a negative terminal;
a resonant switched-capacitor DC-DC converter having positive and negative input terminals and positive and negative output terminals; and
a second DC-DC converter separate from the resonant switched-capacitor DC-DC converter and having positive and negative input terminals and positive and negative output terminals, wherein the positive and negative input terminals of the second DC-DC converter are separate from the positive and negative input terminals of the resonant switched-capacitor DC-DC converter; and
wherein:
the positive and negative input terminals of the resonant switched-capacitor DC-DC converter are connected to the respective positive and negative terminals of the input;
the positive and negative input terminals of the resonant switched-capacitor DC-DC converter directly connect the resonant switched-capacitor DC-DC converter to the input;
the positive and negative input terminals of the second DC-DC converter are connected across an input voltage;
the positive output terminal of the resonant switched-capacitor DC-DC converter is connected to the positive terminal of the output;
the negative output terminal of the resonant switched-capacitor DC-DC converter is connected to the positive output terminal of the second DC-DC converter; and
the negative output terminal of the second DC-DC converter is connected to the negative terminal of the output; and
the output sides of the resonant switched-capacitor DC-DC converter and the second DC-DC converter are connected in series to the output, such that an output voltage of the DC-DC converter system is a sum of the output voltage of the resonant switched-capacitor DC-DC converter and the output voltage of the second DC-DC converter.

15. The DC-DC converter system of claim 14, wherein the second DC-DC converter is a buck-boost DC-DC converter.

16. The DC-DC converter system of claim 15, wherein the resonant switched-capacitor DC-DC converter has a first rated output voltage, the buck-boost DC-DC converter has a second rated output voltage, and the first rated output voltage is greater than the second rated output voltage.

17. The DC-DC converter system of claim 16, wherein the first rated output voltage is greater than about ten times the second rated output voltage.

18. The DC-DC converter system of claim 15, wherein the resonant switched-capacitor DC-DC converter includes first and second switches that operate at about 50% duty cycles, the first switch is on while the second switch is off, and the second switch is on while the first switch is off.

19. The DC-DC converter system of claim 18, wherein the DC-DC converter system has a converter system output voltage between the positive and negative terminals of the output, the buck-boost DC-DC converter has a buck-boost output voltage between its positive and negative output terminals, and the DC-DC converter system is configured to control the buck-boost output voltage to control the converter system output voltage.

20. The DC-DC converter system of claim 15, wherein the positive and negative input terminals of the buck-boost DC-DC converter are connected to the respective positive and negative terminals of the input.

21. The DC-DC converter system of claim 15, wherein the resonant switched-capacitor DC-DC converter includes a filter capacitor, and the positive and negative input terminals of the buck-boost DC-DC converter are connected across the filter capacitor.

22. The DC-DC converter system of claim 15, wherein the resonant switched-capacitor DC-DC converter includes at least two filter capacitors connected in series, and the positive and negative input terminals of the buck-boost DC-DC converter are connected in parallel to the at least two filter capacitors.

23. The DC-DC converter system of claim 14, wherein the resonant switched-capacitor DC-DC converter comprises:
a positive leg connected from the positive input terminal of the resonant switched-capacitor DC-DC converter to the positive output terminal of the resonant switched-capacitor DC-DC converter and including a first switch; and a negative leg connected from the negative input terminal of the resonant switched-capacitor DC-DC converter to the negative output terminal of the resonant switched-capacitor DC-DC converter and including a second switch; and wherein the positive leg is connected to the negative input terminal of the resonant switched-capacitor DC-DC converter through the second switch and the negative leg is connected to the positive input terminal of the resonant switched-capacitor DC-DC converter through the first switch.

24. The DC-DC converter system of claim 23, wherein the positive and negative legs each comprise a plurality of modular cells; the modular cells each comprise a resonant capacitor, a resonant inductor, a pair of diodes and a filter capacitor; and the pair of diodes are connected in series with each other and in parallel with the filter capacitor.

25. The DC-DC converter system of claim 14, wherein the positive and negative input terminals of the second DC-DC converter are connected directly to the respective positive and negative terminals of the input in parallel with the positive and negative input terminals of the resonant switched-capacitor DC-DC converter, and the positive and negative input terminals of the second DC-DC converter directly connect the second DC-DC converter to the input.

* * * * *